United States Patent Office 3,598,730
Patented Aug. 10, 1971

3,598,730
PROCESS OF FLOCCULATING SILICA WITH A CATIONIC XANTHOMONAS GUM ETHER
Robert Nordgren and Harold A. Wittcoff, Minneapolis, Minn., assignors to General Mills, Inc.
No Drawing. Original application Apr. 15, 1968, Ser. No. 721,143, now Patent No. 3,505,310. Divided and this application Dec. 10, 1969, Ser. No. 884,034
Int. Cl. B01d 21/01
U.S. Cl. 210—54                     3 Claims

ABSTRACT OF THE DISCLOSURE

A cationic Xanthomonas microbial gum produced by the reaction of a quaternary ammonium compound and a Xanthomonas microbial gum derived from the aerobic fermentation of the bacterium Xanthomonas. The cationic Xanthomonas microbial gum can be suitably used as a flocculant.

---

This application is a divisional application of our earlier filed copending U.S. application Ser. No. 721,143, filed Apr. 15, 1968 now U.S. Patent No. 3,505,310.

This invention relates to a quaternary ammonium polysaccharide produced by the reaction of a Xanthomonas microbial gum and a quaternary ammonium compound. More specifically, this invention relates to the cationic polysaccharide derived from a reaction of a Xanthomonas hydrophilic colloid and 2,3-epoxypropyl trimethylammonium chloride.

Polysaccharide B–1459 is a polysaccharide gum polymer produced in an aqueous nutrient fermentation medium by the action of the microorganism *Xanthomonas campestris*, B–1459. These Xanthomonas hydrophilic colloids are known for a wide variety of uses such as additions to drilling muds, thickening agents, fortifying agents for candies, etc. It has now been found that a specific cationic Xanthomonas microbial gum is a very satisfactory flocculating agent. By flocculating is meant the process of converting finely divided or colloidally dispersed suspensions of a solid into particle sizes which settle rapidly. It has also been found that a cationic quaternary ammonium Xanthomonas microbial gum will flocculate where noncationic microbial gums produce no flocculation. This invention in its broadest sense encompasses the Xanthomonas microbial gums which are reacted with quaternary ammonium compounds preferably 2,3-epoxypropyl trimethylammonium chloride to give a cationic Xanthomonas hydrophilic colloid.

When practicing a preferred embodiment oft his invention, the Xanthomonas hydrophilic colloid referred to as B–1459, which is produced by *Xanthomonas campestris*, is reacted with the quaternary ammonium compound as disclosed herein. The product of this reaction is a cationic Xanthomonas hydrophilic colloid which will rapidly flocculate finely divided silica under acidic conditions.

The quaternary ammonium microbial gums are provided by reacting the Xanthomonas microbial gum with reactive quaternary ammonium compounds. The quaternary ammonium compounds particularly suitable for this invention may be defined by the following formula

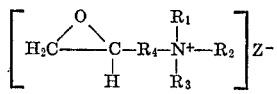

wherein $R_1$, $R_2$ and $R_3$ are from the group consisting of alkyl, substituted alkyl, alkene, aryl and aralkyl groups, $Z^-$ is an anion and $R_4$ is a divalent alkylene radical of 1–3 carbon atoms. Illustrative thereof are —CH$_2$—,

—CH$_2$CH$_2$—, —CH$_2$CH$_2$CH$_2$— and

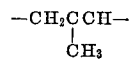

Particularly preferred is the quaternary ammonium compound known as 2,3-epoxypropyl trimethylammonium chloride.

If all $R_1$, $R_2$ and $R_3$ are the same, they each should preferably contain not more than 4 carbon atoms. If all three are not the same and if $R_3$ contains up to 18 carbon atoms then $R_1$ and $R_2$ should preferably be from the group of methyl and ethyl. If $R_1$ and $R_2$ are joined to form a ring then $R_3$ should preferably be from the group of methyl and ethyl. Thus the total number of carbon atoms in $R_1$, $R_2$ and $R_3$ should preferably not exceed 22 carbon atoms and may contain as low as 3 carbon atoms.

The quaternary ammonium compounds may be prepared by reacting a tertiary amine or tertiary amine salt with an epihalohydrin. Tertiary amines having the groups $R_1$, $R_2$ and $R_3$ defined above may be employed. The epihalohydrin employed is one providing the group $R_4$ defined above. If a tertiary amine is employed, $R_4$ is an alkyl group, which contains the epoxy group. If a tertiary amine salt is employed, $R_4$ is a halohydrin group. Illustrative tertiary amine salts are the salts prepared by treating a tertiary amine with hydrochloric acid, sulfuric acid or phosphoric acid.

The preferred tertiary amines are those possessing at least two methyl groups, $R_1$ and $R_2$, attached directly to the nitrogen atom because of their greater reactivity which is maintained even when the third group, $R_3$, contains as many as 18 carbon atoms as in dimethyl stearyl amine. Other tertiary amines which may be employed are dimethyl benzene, dimethyl dodecyl, dimethyl decyl, diethyl stearyl, diethyl dodecyl, diethyl benzene amine, triethyl amine, tripropyl amine, tributyl amine, N-ethyl and N-methyl morpholine, N-ethyl and N-methyl piperidine and methyl diallyl amine.

To prepare the quaternary ammonium compounds, the reagents may be prepared by simply mixing equimolar quantities of the epichlorohydrin and the tertiary amine or the salt thereof, in an aqueous system and allowing the reaction to proceed preferably with agitation until formation of the product is complete. When employing the salts, best results are obtained if the pH of the aqueous system is above 8 and preferably between 9 and 10. The resultant addition product is then recovered by removal by vacuum distillation of the unreacted epihalohydrin and amine.

For illustration, the reaction of epichlorohydrin and trimethylamine may be shown by the following equation:

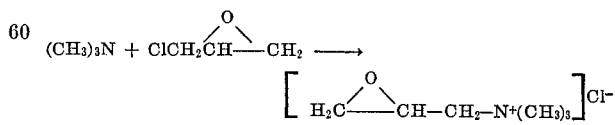

In order to prepare the quaternary ammonium microbial gum ethers of this invention, the above described quaternary ammonium compounds may be dissolved in a suitable solvent such as water, dioxane, or an alcohol, and the microbial gum, preferably *Xanthomonas campestris*, B–1459, added thereto. Any inert solvent may be employed. Among the suitable alcohols are isopropanol, ethanol, and tertiary butanol. A strongly alkaline catalyst is generally employed to promote the reaction. The reaction occurs at room temperature; however heat and increased amounts of catalyst increase the reaction rate. In general, temperatures of at least 30° C. and up to 100° C. may be employed. The catalyst when employed, is preferably not employed in excess of 0.2 mole. Suitable catalysts are the alkali metal hydroxides, alkali earth hydroxides and quaternary ammonium basis such as sodium hydroxide, potassium hydroxide, lithium hydroxide, calcium hydroxide, ammonium hydroxide, and benzyl trimethyl ammonium hydroxide. After the etherification reaction, the catalyst may be left in the reaction product or neutralized with any suitable acid such as acetic or hydrochloric acid. The cationic Xanthomonas microbial gum ether of a quaternary ammonium compound may then be dried for use in powder form. The quaternary ammonium compound is preferably employed in an amount of from .05 to 0.2 mole per molar weight of anhydroglucose unit; however amounts from 0.02 to 0.3 are also useful. By varying the amount of quaternary products, varying degrees of substitution (D.S.) are provided.

Suitable microbiological polysaccharides are those produced by the microbial fermentation of glucose sugar with the bacterium Xanthomonas, especially the species *Xanthomonas campestris*. These microbiological polysaccharides are normally produced by inoculating a medium containing from about 1 to about 5% by weight of a suitable carbohydrate, organic nitrogen sources, dipotassium hydrogen phosphate and appropriate trace elements, with an organism of the genus Xanthomonas and then permitting the culture to incubate at about room temperature and under aerobic conditions for a period of about 3 days. Carbohydrates which may be employed in this manner include glucose, fructose, maltose, sucrose, lactose, galactose, and the like. While the *Xanthomonas campestris* is the bacterium preferred, other related species of Xanthomonas may be satisfactorily used. Such other species are *Xanthomonas begoniae*, *X. vesicatoria*, *X. malvacearum*, *X. incanae*, *X. vasculorum*, *X. carotae*, *X. translucens*, etc. At the end of the incubation period, the crude polymer formed in the culture medium can be separated from the bacterial cells by filtration and thereafter isolated and purified by precipitation with methanol, ethanol, acetone or a similar reagent. After drying, the microbiological polysaccharide is recovered as a light fluffy powder which may be slightly tainted by colored materials from the culture medium. Suitable methods of producing a microbiological polysaccharide are disclosed in U.S. Pat. 3,000,790 and the following articles:

"Information on Polysaccharide B–1459," Northern Utilization Research and Development Division, U.S. Department of Agriculture, Peoria, Ill., No. Ca–N–9, September 1959.

"New Polysaccharide Gums Produced by Microbial Synthesis," Manufacturing Chemist, May 1960.

Journal of Biochemical and Biological Technology and Engineering, vol. III, No. 1 (S. P. Rogovin et al.).

The dried cationic Xanthomonas hydrophilic colloid may be used as a flocculant to remove finely divided substances, such as silica, from slurries. Other embodiments and uses of the product of this invention will be readily apparent to those skilled in the art.

The following examples will further illustrate but are not intended to limit the scope of this invention.

EXAMPLE I

The following reactants were placed in a flask fitted with a thermometer, stirrer, and a reflux condenser.

Microbiological polysaccharide, *Xanthomonas campestris*, B–1459—100 grams
Isopropanol 99%—150 grams
Sodium hydroxide (2 grams dissolved in 70 milliliters of water)—70 milliliters
2,3-epoxypropyl trimethylammonium chloride (57% in water)—26.8 grams The reactants were stirred and gradually heated to a reflux temperature of 81° C. and then maintained under reflux for 2 hours. After the 2 hour period, the alkaline catalyst was neutralized with 3 milliliters of acetic acid. The reaction product was filtered, washed with isopropanol, and dried at 60° C. The dried product was analyzed and found to have a dry weight gain of 14 grams. The percent nitrogen on the reacted microbiological polysaccharide was found to be 1.99% while on the unreacted microbiological polysaccharide it was 1.22%. These results indicated a degree of substitution of 0.1–0.18 mole of 2,3-epoxypropyl trimethylammonium chloride per monomer unit of the microbiological polysaccharide gum, B–1459. In this manner, a highly active cationic polymer was produced.

EXAMPLE II

To show the flocculating properties of the above cationic gum, two 100 milliliters samples were prepared as follows:

| | Amount, grams |
|---|---|
| Hydrated silica, average particle size 0.022 micron | 0.5 |
| HCl | 18 |
| Water | 82 |

To one of the samples, there was added 10 milliliters of a 0.5% aqueous solution of a cationic microbial gum of Example I. Within 3 minutes, the silica in the above solution was flocculated and settled. To the other sample, there was added a 0.5% aqueous solution of the non-cationic, unreacted microbial gum B–1459. The non-reacted or non-cationic B–1459 had no effect upon the silica.

The cationic microbial gums as disclosed herein can be satisfactorily used in any process where it is desired to have a charged colloid, i.e. sizing of paper, textiles, etc. Also, it is beneficial to use a cationic microbiological polysaccharide in many thickening operations. Other uses of this cationic microbiological polysaccharide will be readily apparent to those skilled in the art.

The embodiments of the invention in which an exclusive property or privilege is claimed are defined as follows:

1. A process of flocculating a solution containing finely divided silica particles comprising acidifying said solution and treating said acidified solution with a cationic Xanthomonas gum ether of a quaternary ammonium compound.

2. The process of claim 1 wherein the quaternary ammonium compound is 2,3-epoxypropyl trimethylammonium chloride.

3. The process of claim 1 wherein said solution is acidified with hydrochloric acid.

References Cited

UNITED STATES PATENTS

| 3,244,695 | 4/1966 | Schweiger | 260—209 |
| 3,376,282 | 4/1968 | Schweiger | 260—209X |
| 3,406,114 | 10/1968 | Goren | 210—54 |
| 3,418,237 | 12/1968 | Booth et al. | 210—54 |
| 3,422,085 | 1/1969 | Gill et al. | 260—209 |
| 3,467,647 | 9/1969 | Benninga | 210—54X |

MICHAEL ROGERS, Primary Examiner

U.S. Cl. X.R.

106—288B, 308C; 252—180; 260—209